(12) United States Patent
Kelemen (10) Patent No.: US 10,672,525 B2
(45) Date of Patent: Jun. 2, 2020

(54) POSITIONING AND INSPECTION APPARATUSES FOR USE IN NUCLEAR REACTORS

(71) Applicant: GE-Hitachi Nuclear Energy Americas LLC, Wilmington, NC (US)

(72) Inventor: Colin F. Kelemen, Austin, TX (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 250 days.

(21) Appl. No.: 15/712,126

(22) Filed: Sep. 21, 2017

(65) Prior Publication Data

US 2019/0088377 A1 Mar. 21, 2019

(51) Int. Cl.
*B23P 11/00* (2006.01)
*G21C 17/003* (2006.01)

(52) U.S. Cl.
CPC ................... *G21C 17/003* (2013.01)

(58) Field of Classification Search
CPC ......... B23P 11/00; B23P 11/027; B23P 19/04; B23P 19/10; G21C 17/003
See application file for complete search history.

(56) References Cited

U.S. PATENT DOCUMENTS

| 2013/0315364 A1* | 11/2013 | Bresous | G21C 19/11 376/269 |
| 2017/0140844 A1* | 5/2017 | Kelemen | G21C 17/013 |
| 2019/0088377 A1* | 3/2019 | Kelemen | G21C 17/003 |

* cited by examiner

*Primary Examiner* — Lee D Wilson
(74) *Attorney, Agent, or Firm* — Ryan Alley IP (57) ABSTRACT

Devices position inspection and operation tools in a nuclear reactor without use of a bridge or other maintenance structure well above the reactor core. Devices can selectively join to in-reactor structures like steam dams through clamping that permits limited movement. Positioning assemblies may be supported by the devices. The positioning assembly includes a mast that moves relative to the positioning assembly. Rollers of the positioning assembly may so move the mast. The positioning assembly may be rotated with a sun gear having an exterior surface about which the mast and rollers can revolve. A local motor or external drive may provide power for this rotation and/or revolving as well as rotation of the rollers to move the mast and assembly. Devices are useable underwater or submerged in fluid and may include instruments with powering lines or mechanical extensions that permit powering or direct interfacing from operators outside the reactor.

20 Claims, 11 Drawing Sheets

POSITIONING AND INSPECTION APPARATUSES FOR USE IN NUCLEAR REACTORS

BACKGROUND

Figure 1:
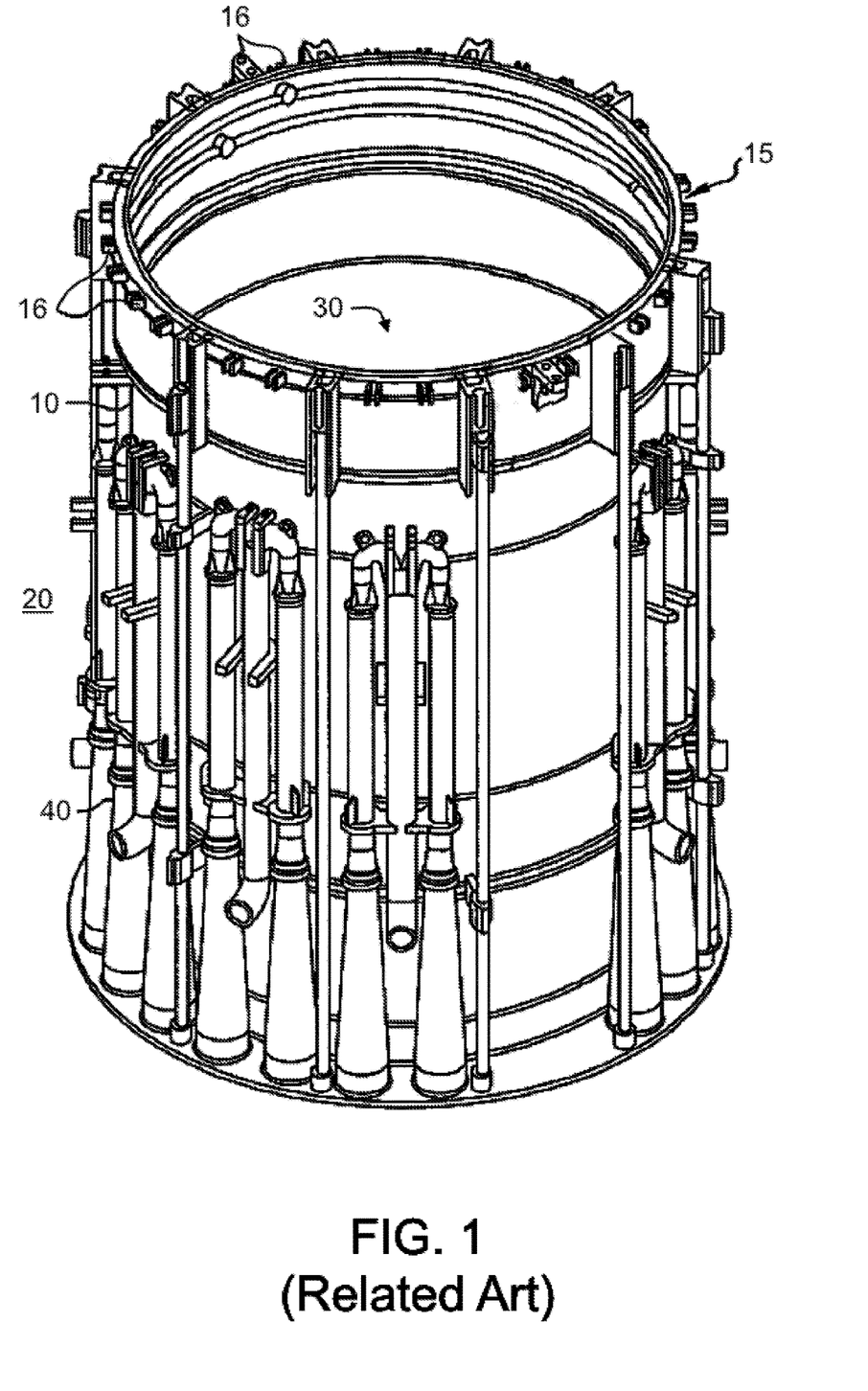
FIG. 1 is an illustration of a related art nuclear power vessel core shroud.

FIG. 1 is selective view of a related art nuclear core shroud 10, useable in a nuclear reactor like a BWR. Core shroud 10 may be positioned in a downcomer annulus region 20, which is an annular space formed between shroud 10 and an inner wall of a reactor pressure vessel (not shown) that receives fluid coolant flow and directs it downward for entry at a bottom of core 30. Shroud 10 may be a cylindrical structure surrounding core 30 that partitions the reactor into these downward and upward coolant flows on opposite radial sides of shroud 10. One or more jet pump assemblies 40 may line annulus 20 and direct coolant flow in this manner.

After being directed downward past core shroud 10, coolant may then flow up through core 30 inside shroud 10. Core 30 is typically populated by several fuel assemblies (not shown) generating heat through nuclear fission during operation, and the coolant exiting core 30 may be quite energetic and potentially boiling. This energetic fluid flows up through and out of core 30 and shroud 10, potentially into steam separating and drying structures and ultimately to a turbine and generator that converts the energy from the steam flow into electricity. A top portion 15 of shroud 10 may terminate below such drying structures, and various core equipment may rest on or join to shroud 10 about top portion 15, which may be called a steam dam. One or more protrusions or obstacles 16, such as steam dam gussets, seismic pins, or lugs, may be aligned about top portion 15 of shroud 10 to support or join a shroud head (not shown), chimney, or drying structures.

During a reactor outage, such as a refueling outage or other maintenance period, the reactor vessel may be opened and inspected, and internal structures of vessel may be removed. During an outage, loading equipment such as a bridge and trolley above the reactor, and 20-30 feet above core 30 and shroud 10, may move and load new fuel assemblies in core 30. Similarly, worker platforms may be installed about partial perimeters of the vessel for handling tools and inspections about the reactor periphery. Visual inspections of shroud 10, core 30, and/or any other component can be accomplished with video or camera equipment operated from the bridge or other loading equipment above the reactor during this time.

SUMMARY

Example embodiments include devices useable for inspection or tooling in a nuclear reactor with accurate positioning and non-interference with other reactor internals or refueling activities. A base inspection assembly, useable as a peripheral assembly on a steam dam or other nuclear reactor component, may clamp to various structures within the nuclear reactor and be moveable, with a handling rod, local motors, or other drive, around a perimeter of the reactor. A positioning assembly may be supported by the base inspection assembly and include rollers that rotate against a mast to relatively move the positioning assembly with respect to the inspection assembly and/or mast. Rollers may mesh or grip on sides of the mast to move along the same while rotating with minimal slippage or disconnection during operation. The rollers may be powered locally, such as with a motor, or externally, through a transmission that drives one or more of the rollers to rotate. The rollers may selectively bias against the mast to achieve engagement and disengagement from the same, such as with an expander that pushes one or more rollers to the mast when expanded. The rollers and mast are further rotatable relative to the base inspection assembly. For example, a sun gear secured to the base inspection assembly may provide an exterior surface about which the mast and rollers can revolve. If the sun gear is annular or includes an opening, the mast may extend through a center of the same and rotate on an axis of the sun gear, mast, and rollers. A local motor or external drive may provide power for this rotation and/or revolving. Any instrument, such as a camera, welding tool, cleaning sprayer, laser, ultrasonic tester, etc. can be joined to the mast and/or positioning assembly and be selectively moved and rotated by the same.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and the are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The Inventor has newly recognized that visual inspection of a nuclear reactor core from refueling equipment several feet above the core, such as a refueling bridge, trolley, crane, peripheral platform, etc., using cameras or other video capture equipment supported by such refueling equipment results in inferior inspection. For example, vibrations from trolley movement or operating equipment—or even personnel footfalls on the bridge—can cause a camera, supported by the trolley while extending dozens of feet down into a reactor core, to lose picture quality and verifiable position through such vibration. Movement and distance of the refueling equipment further compounds difficulty in verifying position of any camera or other inspection device, like an ultrasonic tester, with respect to object being inspected. Thus, inspections conducted from refueling equipment and reactor platforms several feet above a reactor during an outage typically require several different position verification mechanisms and avoidance of movement or vibration by personnel, or inspections must be repeated until satisfactory.

The Inventor has further newly recognized that inspection and tool-usage activities in a nuclear power plant when performed above and radially offset from a target, such as from a refueling bridge or reactor perimeter, interferes with effective tool usage because the target is not directly below the operator. In such circumstances, the operator may be required to lean over and/or adopt a skewed working trajectory with the tool, which complexifies visuals and makes exact radial or vertical positioning of the target, and the user relative to the target, difficult to determine. Example embodiments described below address these and other problems recognized by Inventors with unique solutions enabled by example embodiments.

The present invention is maneuvering devices useable in nuclear reactors and similar environments. In contrast to the present invention, the few examples discussed below illustrate just a subset of the variety of different configurations that can be used as and/or in connection with the present invention. Co-owned US Patent Publication 2017/0140844 published May 18, 2017 to Kelemen is incorporated herein by reference in its entirety.

Figure 2:
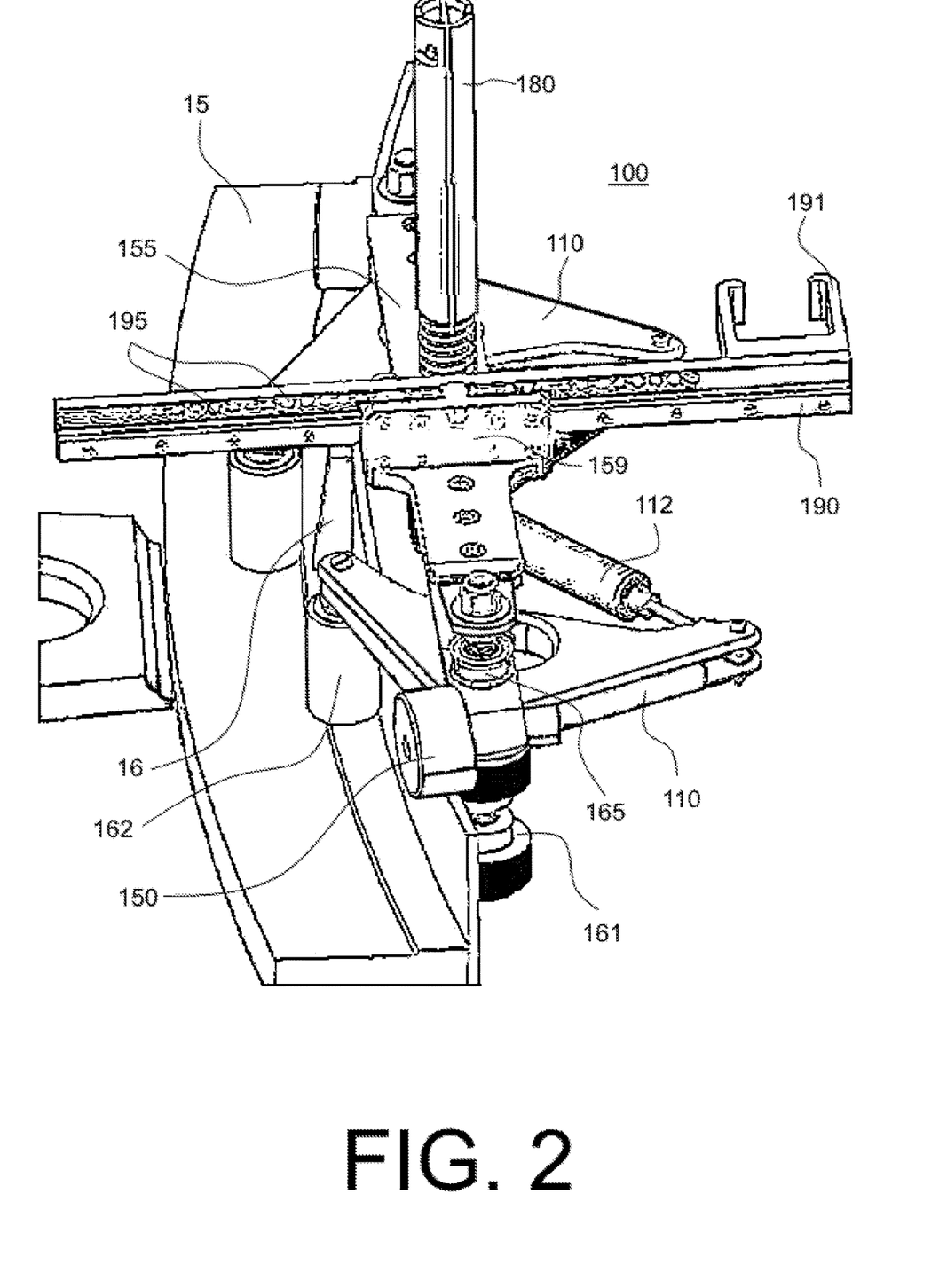
FIG. 2 is an illustration of an example embodiment inspection assembly mounted to a steam dam.
Figure 3:
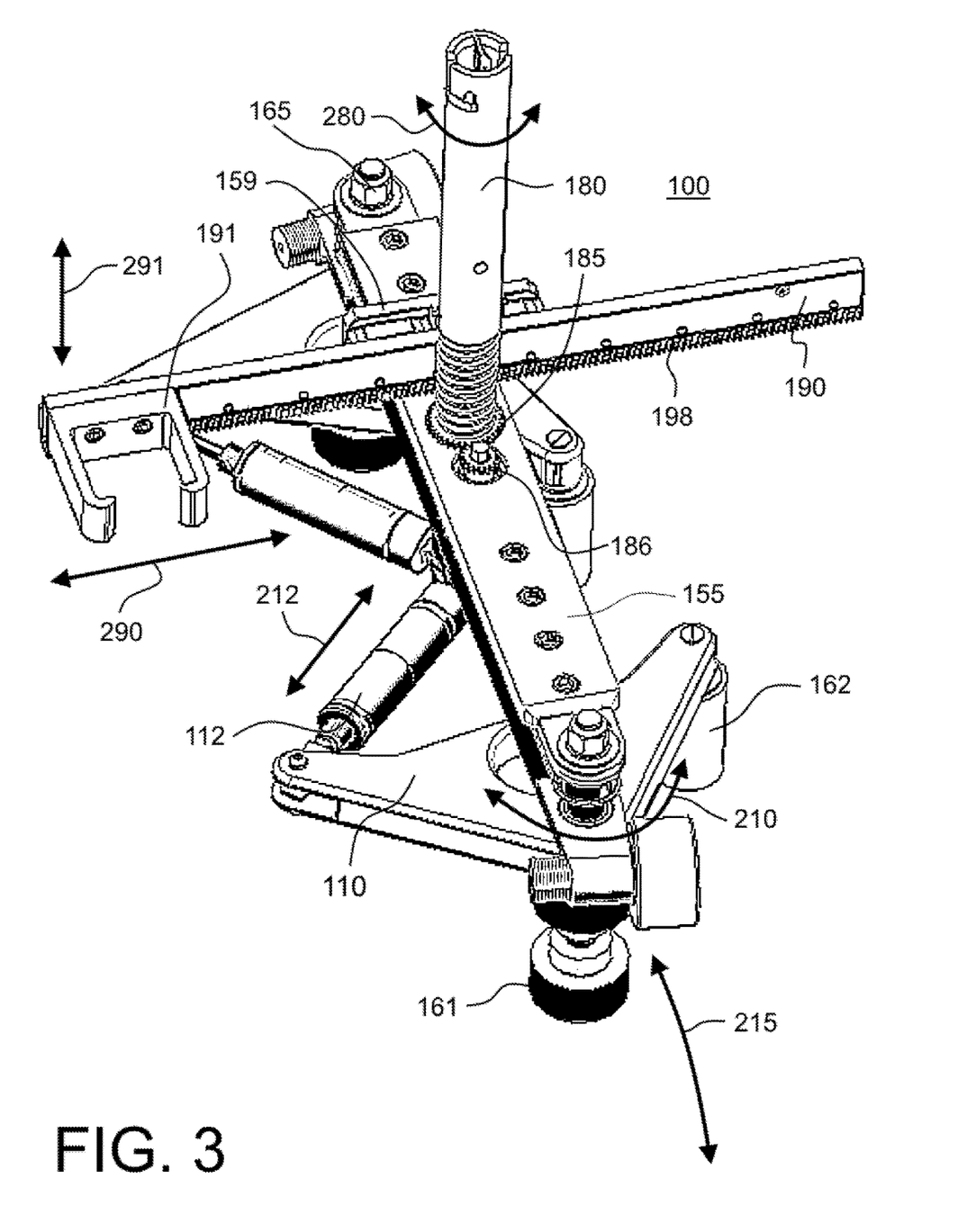
FIG. 3 is another illustration of the example embodiment inspection assembly from FIG. 2.

FIGS. 2 and 3 are illustrations of an example embodiment inspection assembly 100 useable in nuclear reactors. As shown in FIG. 2, assembly 100 is useable in conjunction with steam dam 15 at a top of a core shroud, such as shroud 10 in FIG. 1. Assembly 100 is shown again in FIG. 3 without steam dam 15, with directions that illustrate movements assembly 100 may be capable of on steam dam 15 (FIG. 2). Example embodiment assembly 100 may removably join to steam dam 15 and be moveable about the same to inspect equipment and reactor components from steam dam 15. For example, assembly 100 may include one or more top rollers 150 that allow assembly 100 to vertically seat on an edge or flange of steam dam 15 and move circumferentially (direction 215 in FIG. 3) along steam dam 15 while top rollers 150 rotate.

Because steam dam 15 may be relatively fixed and close to structures in a core of a nuclear reactor, example embodiment assembly 100 may be advantageously positioned at verifiable and constant vertical positions from such structures by top roller 150 rolling on steam dam 15, as well as being angularly moveable along steam dam 15 to other desired positions. Top rollers 150 may be freely or selectively rotatable and even driven by a local motor or via a mechanical drive to facilitate desired movement or static positioning in the circumferential direction (direction 215 in FIG. 3).

Figure 4:
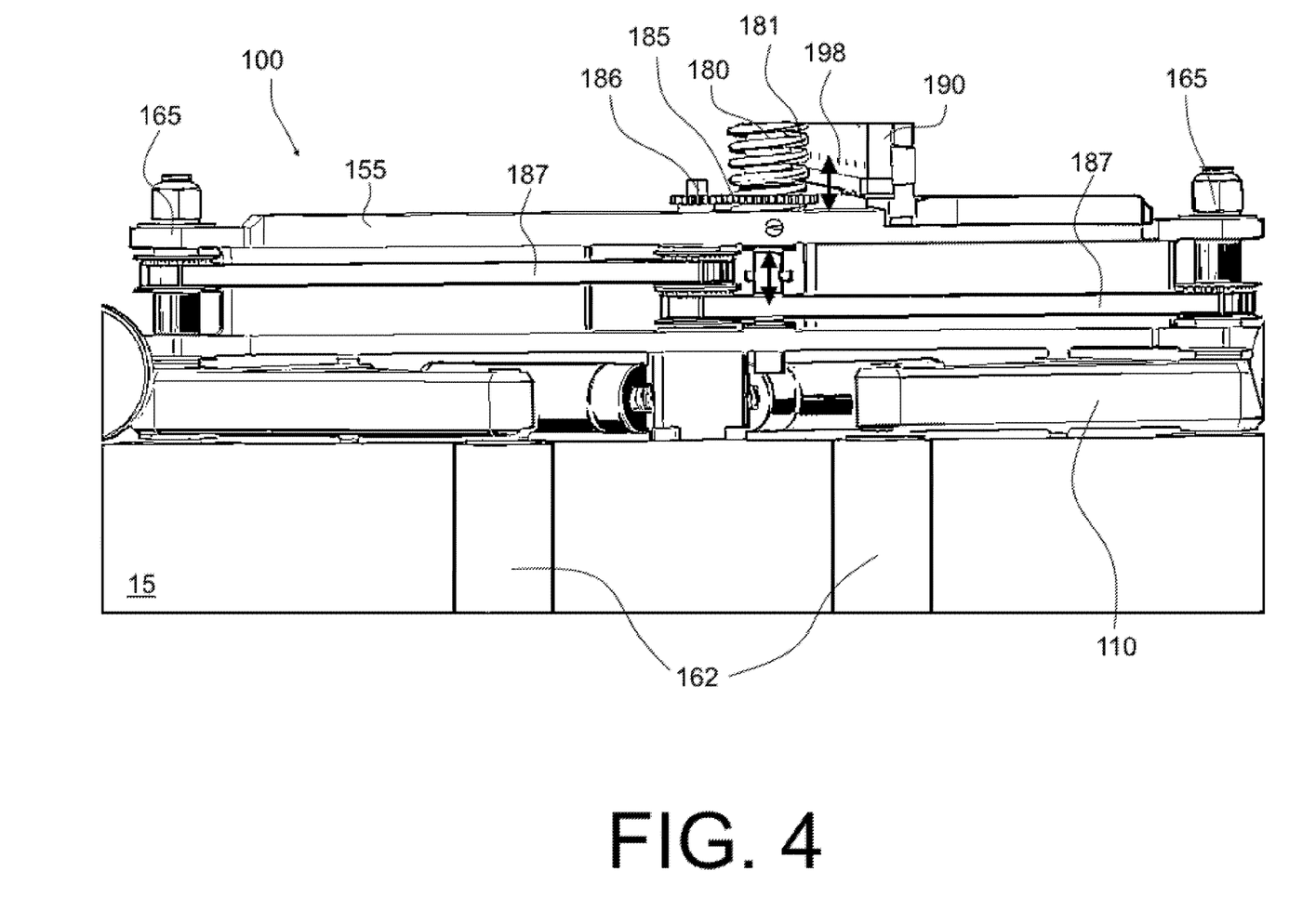
FIG. 4 is a profile illustration of the example embodiment inspection assembly from FIG. 2.

Example embodiment assembly may further include structures that removably join to an edge or flange of steam dam 15 to secure assembly 100 at a desired radial position. For example, one or more pairs of clamping rollers may join to a flange of steam dam 15 from which obstacles 16, including gussets, lugs, seismic pins, and other structures protrude. As shown in FIG. 4, paired interior clamp roller 161 and exterior clamp roller 162 may engage opposite vertical sides of steam dam 15. Paired interior and exterior rollers 161 and 162 allow assembly 100 to radially seat on an edge or flange of steam dam 15 and move circumferentially (direction 215 in FIG. 3) along steam dam 15 by rotation of rollers 161 and 162. This engagement may further facilitate positioning of assembly 100 at verifiable and constant radial positions (direction 290 is radial in FIG. 3) from structures via interior and exterior clamp rollers 161 and 162 rolling on steam dam 15. Rollers 161 and 162 may be freely or selectively rotatable and even driven by a local motor or via a mechanical drive in order to facilitate desired movement or static positioning in the circumferential direction (direction 215 in FIG. 3). An example of a mechanical drive useable to rotate rollers 161 and 162 is described further below in connection with FIG. 4.

Example embodiment inspection assembly 100, although potentially moveable in other directions, may remain static in a radial direction (direction 290 in FIG. 3) while mounted to steam dam 15. In this way example assembly 100 may be continuously positioned with steam dam 15, and inspection of any structures with example embodiment assembly 100 may be verified with a known relation to steam dam 15. Interior clamp roller 161 and exterior clamp roller 162 may forcefully seat against opposite sides of steam dam 15 to secure assembly 100 in a radial direction (direction 290 in FIG. 3). For example, as shown in FIG. 2, exterior roller 162 may be connected to a rotatable biasing arm 110 that swings about a pivot point 165 so as to move exterior roller 162 about pivot point 165 in direction 210 (FIG. 3). Interior roller 161 may be near or directly on an axis of pivot point 165, such that exterior roller 162 can torque or clamp against steam dam 15 with interior roller 161. Such spacing may create a torque arm between interior roller 161 at pivot point 165 and exterior roller 162, preventing both radial movement of assembly 100 as well as rotation of assembly 100 in the 210 direction (FIG. 3). Of course, other joining structures may selectively mate example assembly 100 with steam dam 15, including spring-based roller clamps, or elastic or mechanical clamps and attachments.

Any structure that joins example embodiment assembly 100 to steam dam 15 may be selectively disengaged to avoid obstacles 16 or account for other structures that may interrupt movement along steam dam 15 in an angular direction (direction 215 in FIG. 3). Such disengagement may not interfere with an otherwise secure mounting of example assembly 100 on steam dam 15. For example, exterior clamp roller 162 may be selectively disengaged or moveable upon encountering an obstacle 16 like a gusset protruding from a top flange of steam dam 15, such that assembly 100 may continue moving in a circumferential direction along steam dam 15 without separating from steam dam 15. Such movement may be permitted by a spring resistively pushing arm 110 and exterior roller 162 to clamp against steam dam 15, or selective disengagement may be achieved by rotating biasing arm 110 with a pneumatic cylinder 112 as shown in FIG. 2.

For example, pneumatic cylinder 112 may rotate biasing arm 110 in direction 210 (FIG. 3) through actuation from a pneumatic line (not shown) run to assembly 100 or from a remotely controlled actuator. Such actuation of pneumatic cylinder 112 may cause expansion or contraction in direction 212 (FIG. 3), rotating exterior clamp roller 162 in direction 210 (FIG. 3) selectively against or away from steam dam 15. In the instance of contraction of pneumatic cylinder 112, exterior roller 162 may be rotated away from steam dam 15 and obstacle 16 thereon. Such movement may permit exterior roller 162 to pass over obstacle 16 when example assembly 100 is moving in an angular direction 215 (FIG. 3) along steam dam 15. In the instance of expansion of pneumatic cylinder 112, exterior roller 162 may be rotated toward steam dam 15 and movably secure assembly 100 thereto as discussed above.

Example embodiment inspection assembly 100 may include a pair of arms 110 each with rollers 161 and 162 and pneumatic cylinder 112 joined to a single, rigid frame 155, as shown in FIGS. 2 and 3. Through the use of plural biasing arms 110 connecting to a shared frame 155, as long as one arm 110 remains clamped, with rollers 161 and 162 biased against steam dam 15, selective disengagement of any other biasing arm(s) 110 to permit roller relocation and potentially avoid obstacles is possible while keeping assembly 100 secured in a radial direction (direction 290 in FIG. 3) with steam dam 15. That is, rollers 162 may individually step over steam dam obstacles 16 or other objects without possibility of spurious movement of frame 155 in directions 290 or 210 (FIG. 3) due to other secured rollers. In this way, an operator may selectively disengage only those rollers approaching or abutting an obstacle 16 like a gusset, such as through individually contracting associated cylinders 112 through a pneumatic line or wireless actuator, for example, while maintaining at least one clamp roller pair 161/162 biased and secured to steam dam 15, thus overall maintaining frame 155 and example embodiment assembly 100 coupled with steam dam 15.

While a pair of biasing arms 110 with selectively controllable pneumatic cylinders 112 are shown in the example of FIGS. 2 and 3 to control positioning and clamping of pairs of rollers 161 and 162, it is understood that other selectively movable structures, such as track and gears, magnets, ball clamps, spring-biased rollers, etc., may equally be used to both provide movement of example assembly 100 in radial direction 215 (FIG. 3) and maintain a constant radial position and orientation with regard to steam dam 15 while avoiding obstacles through selective, individual disengagement.

As shown in FIG. 3, example embodiment inspection assembly 100 includes a handling rod 180 connecting to frame 155, which may be connected to an inspection arm 190 with a utility end 191. Inspection arm 190 may be moveable with respect to frame 155. For example, inspection arm may be extendible and retractable in a radial direction 290 by slidably engaging with a detent frame 159. Inspection arm 190 may include a utility end 191 shaped to secure to a tool, such as an inspection device including a camera or ultrasonic tester, for example. Utility end 191 is shown in FIG. 3 as an open-faced square jaw to secure a matching square end of a camera or other tool; however, any other shape or moveable clamping structure can be used for utility end 191, such as the examples of FIGS. 6B and 6C and FIG. 7. Multiple utility ends 191 may be used, such as one at each end of inspection arm 190, to perform operations both interior to and exterior to a steam dam or other mounting structure on both sides of assembly 100.

Inspection arm 190 and/or utility end 191 may be further mobile in any dimension, such as vertically in direction 291, vertically about an axis in direction 291, or angularly about rod 180 in a direction 280, either alone/separately with regard to a remainder of assembly 100 or in combination therewith. In this way, an inspection device or other tool can be engaged in utility end 191 and moved to desired radial and vertical positions through movement of inspection arm 190 and/or utility end 191, while example embodiment assembly 100 otherwise remains at a fixed radial and vertical position on a steam dam or other structure. For example, an instrument attached to utility end 191 may be maneuvered around obstacles like steam separator hold down lugs on an exterior of steam dam 15 through radial and/or angular movement of inspection arm 190 as these obstacles are encountered by the instrument or any mast to which it is attached.

Handling rod 180 may operate and/or move one or more different components of example embodiment inspection assembly 100. As shown in FIG. 3, handling rod 180 may include selection gear 185 that matches a gear track 198 of inspection arm 190. As handling rod 180 is rotated in direction 280, inspection arm 190 may be radially extended or retracted in direction 290 by selection gear 185 meshing with gear track 198 and driving inspection arm 190 in direction 290 as inspection arm 190 slides in detent frame 159. As shown in FIG. 2, inspection arm 190 may include one or more indentations 195 along its length that pass through detent frame 159, which may include a spring or other biased element that matches with one of the indentations 195 and resists further free extension or retraction of inspection arm 190. In this way, inspection arm 190 may be extended at known or desired intervals based on spacing of indentations 195 and resistance to further movement imparted by detent frame 195.

As further shown in FIG. 3, lower selection gear 185 of handling rod 180 may further be positioned to mate with circumferential drive gear 186 in frame 155 of assembly 100. Handling rod 180 may further rotate circumferential drive gear 186 by rotating in direction 280. Handling rod 180 may discriminate between inspection arm 190 and drive gear 186 by moving laterally or vertically between the two, so as to contact only one of gear track 198 or teeth of gear 186 at any time with lower selection gear 185. Of course, closer selection gear 185 may also simultaneously drive inspection arm 190, gear 186, and/or any other structures.

FIG. 4 is a detail illustration of a profile of example embodiment inspection assembly 100, showing some potential structures that are drivable with handling rod 180. As shown in FIG. 4, selection gear 185 of handling rod 180 may be vertically separated from gear track 198 and drive gear 186; that is, selection gear 185 may engage only one of drive gear 186 and gear track 198 depending on a vertical displacement. Spring 181 may bias selection gear 185 downward such that a default engagement is with driver gear 186 and an upward force must be imparted by an operator of rod 180 to move upward and engage gear track 198. A lower stem of pole 180 may be captured by frame 155 to permit limited vertical movement of lower selection gear 185 between drive gear 186 and gear track 198, shown by matching vertical arrows in FIG. 4.

Circumferential drive gear 186 may power one or more interior clamp rollers 161 (FIG. 2), as discussed above in connection with FIG. 2. For example, as shown in FIG. 4, drive gear 186 may connect to one or more transmissions 187 between drive gear 186 and pivot points 165. Transmission 187 may be an extension that transfers rotation between drive gear 186 and roller 161 (FIG. 2) via pivot point 165, such as a gearbox or a chain or band that rotates with gear 186 and pivot point 165 to turn interior rollers 161. In this way, when handling pole 180 is engaged with drive gear 186 and rotated in direction 280 (FIG. 3), the force may be transmitted via transmission 187 to one or more interior rollers 161 biased against steam dam 15. In this way, example embodiment inspection assembly may be moved in circumferential direction 215 (FIG. 3) through rotation of handling pole 180. When handling rod 180 is raised against spring 181 so that lower selection gear 185 mated with gear track 198, similar rotation of handling rod 180 may instead move inspection arm 190.

Handling rod 180 may extend several feet vertically, potentially all the way outside of any opened and flooded reactor, to human operators well above steam dam 15. Handling rod 180 may include a U-joint or flexible portion surrounded by spring 181 to permit some non-vertical or off-axis positioning while still transferring rotation to selection gear 185. Handling rod 180 may further include voids or floats to offset any weight of rod 180 or entire assembly 100, resulting in better vertical positioning of rod 180 under tension from such floats or cavities when submerged in reactor coolant. Odometers, rotation counters, electrical sensors, and the like are useable in connection with pole 180 to track and/or display an accurate position and/or number of turns of handling rod 180 in connection with gear 186 and/or inspection arm 190. In this way, a user may be able to accurately track a degree of circumferential movement of example assembly 100 and/or a degree of radial extension/retraction of inspection arm 190.

Although example embodiment inspection assembly 100 is shown with a handling rod 180 driving various features of assembly 100, including circumferentially-driving rollers and an inspection arm, it is understood that any number of different power-providing devices and powered components are useable in assembly 100. For example, handling rod 180 may be powered to automatically rotate and raise/lower to interact with desired components by an operator handling the same from above; or handling rod 180 may drive other rollers, arms, and utility end movements in example embodiments. Or, for example, one or more remotely-operated motors may control movement and biasing of any or all of rollers 150, 161, and 162, inspection arm 190, and biasing arms 110. In this way, a remote user may still control movement of assembly in direction 215, actuation and release of rollers 161 and 162, and/or radial or vertical movement of inspection arm 190. Such motors may equally be paired with sensors that measure and report a degree of movement or force in any controlled element of assembly 100. Such sensors and controls may further power and control any inspection device, such as a camera or ultrasonic tester, paired with utility end 191.

Figure 5:
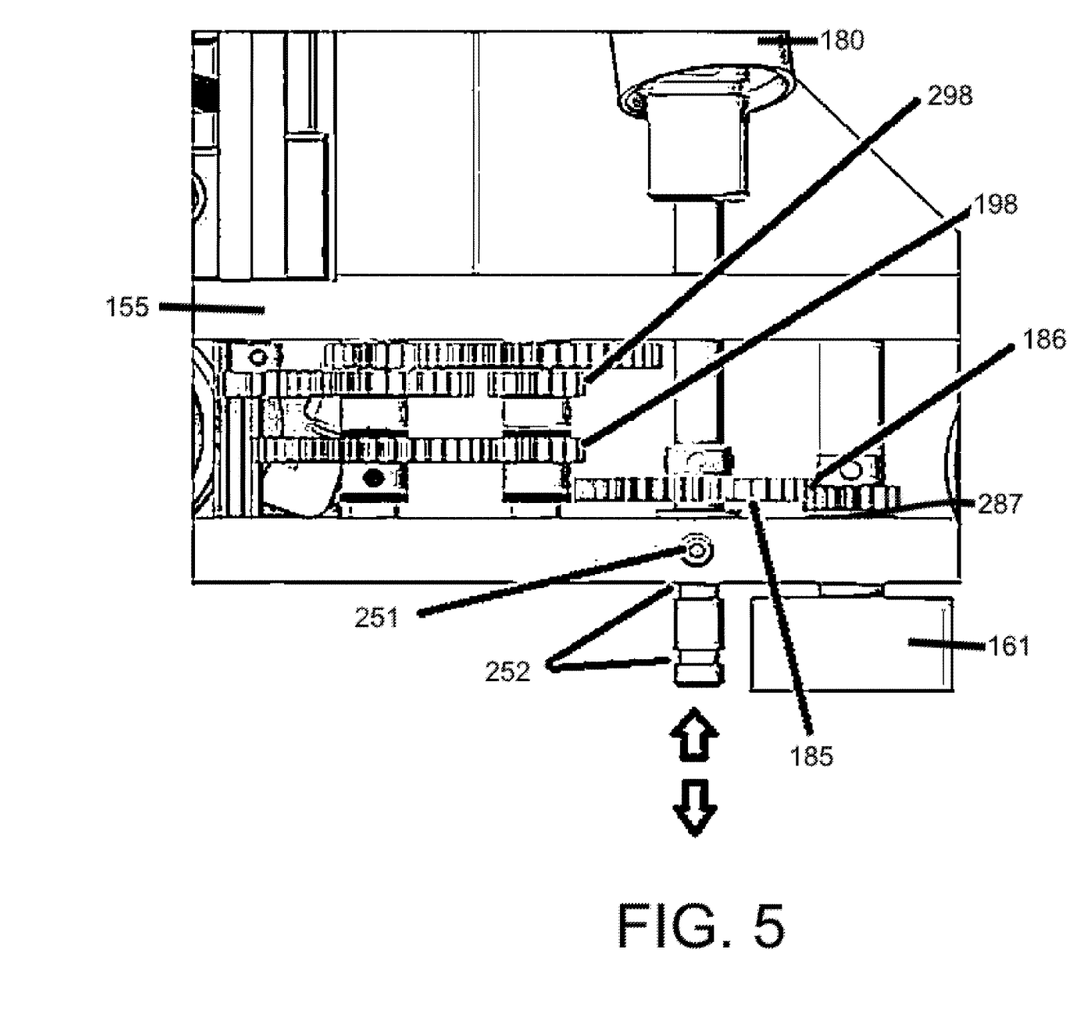
FIG. 5 is a detail illustration of a selective gearing for movement of another example embodiment inspection assembly.
Figure 7:
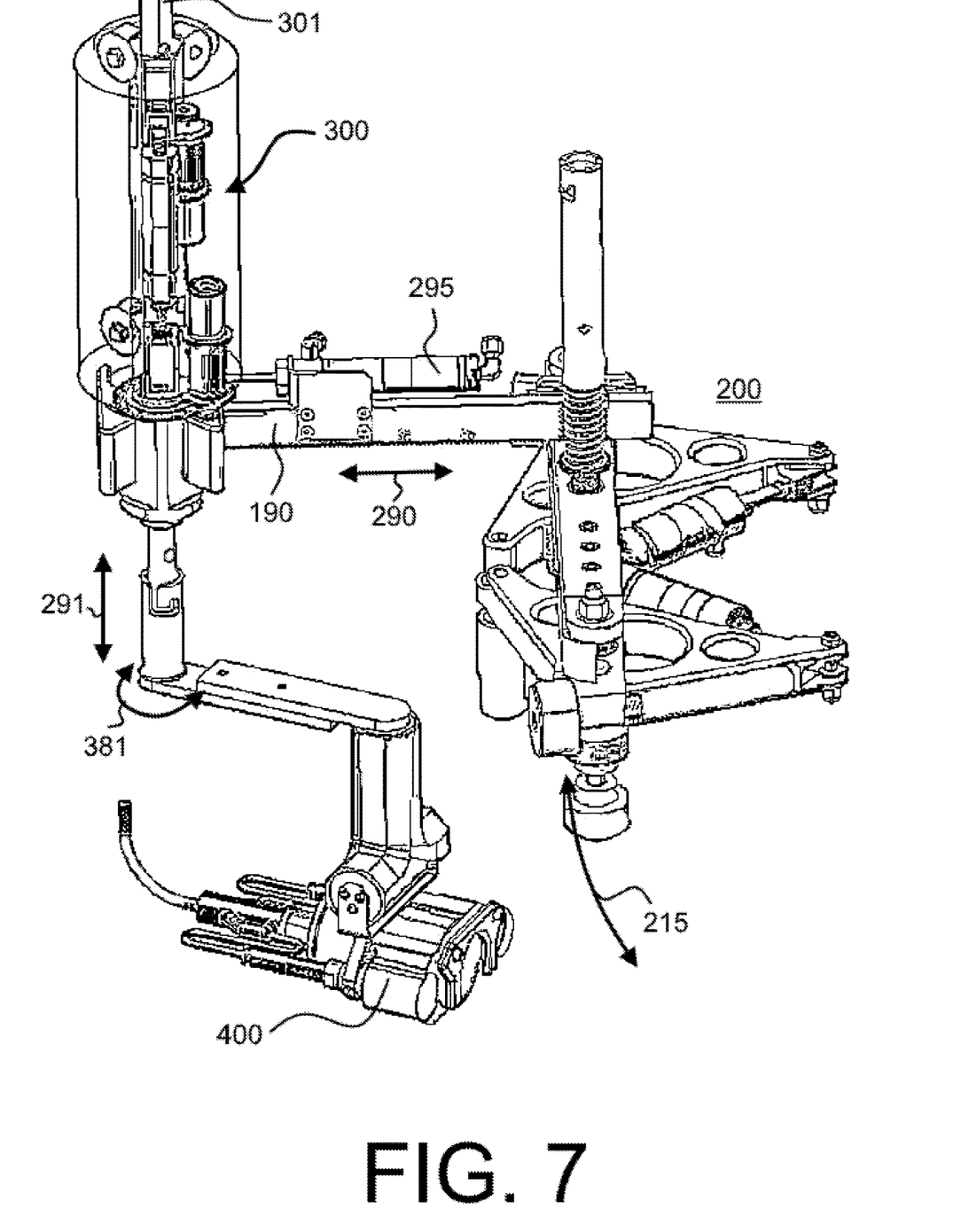
FIG. 7 is an illustration of an example embodiment vertical maneuvering assembly in combination with an example embodiment inspection assembly.

FIG. 7 is an illustration of another example embodiment inspection assembly 200, in use with an example embodiment vertical maneuvering assembly 300. Inspection assembly 200 may be substantially similar to example embodiment inspection assembly 100 (FIG. 2), except FIG. 5 may use different structures that are drivable with handling rod 180. As shown in FIG. 5, selection gear 185 of handling rod 180 may vertically move between circumferential drive gear 186, track gear 198, and vertical drive gear 298 and engage only one at a time depending on a vertical displacement. Spring 181 (FIG. 4) may still bias selection gear 185 downward. Further, a biased detent 251 may seat into detent grooves 252 in handling rod 180 to retain selection gear 185 of handling rod 180 at specific vertical positions of drive gear 186, track gear 198, or vertical drive gear 298. In this way, selection gear 185 may be locked, or retained until met with overcoming vertical force, at a meshed position for operation and movement in selected directions of example embodiment assembly 100.

As shown in FIG. 5, drive gear 186 may connect by shaft 287 to clamp roller 161, such that rotation of drive gear 186 by selection gear 185 on rod 180 causes circumferential movement 215 along a steam dam or other structure by rotation of clamp roller 161. Further, instead of seating in a track, selection gear 185 may extend and retract inspection arm 190 via track gear 198. Selection gear 185 may also vertically move assembly 200 via vertical drive gear 298. Track gear 198 and drive gear 298 may connect through frame 155 to a track on arm 190 and/or a vertical surface of a mast or connection rod. Rotation of these gears is thus translated into radial movement of arm 190 or vertical movement of assembly 200, depending on which gear 198/298 is engaged. In this way, discreet vertical positioning of rod 180 may allow selection among three different types of movement in example embodiment inspection assembly 200, achieved by rotating rod 180 at the desired vertical level. Of course, motorization of any or all of gears 186, 198, and 298 is also possible to drive this movement without rod 180 providing energy to do so.

Figure 6A:
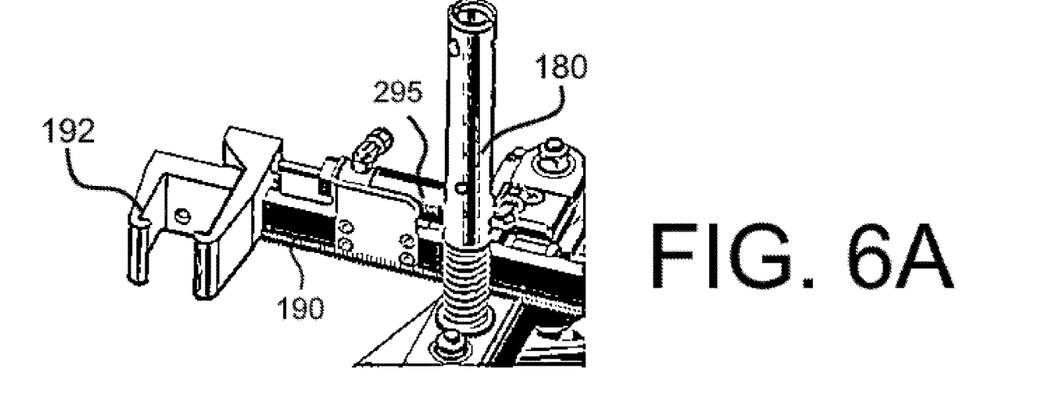
FIG. 6A is a detail illustration of an alternative utility end useable with example embodiment inspection assemblies.
Figure 6B:
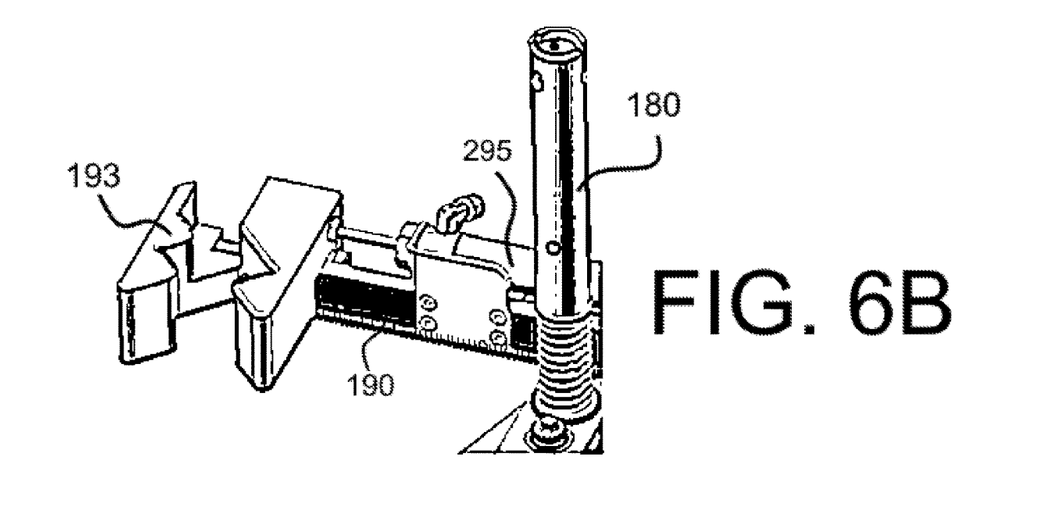
FIG. 6B is a detail illustration of an alternative utility end useable with example embodiment inspection assemblies.
Figure 6C:
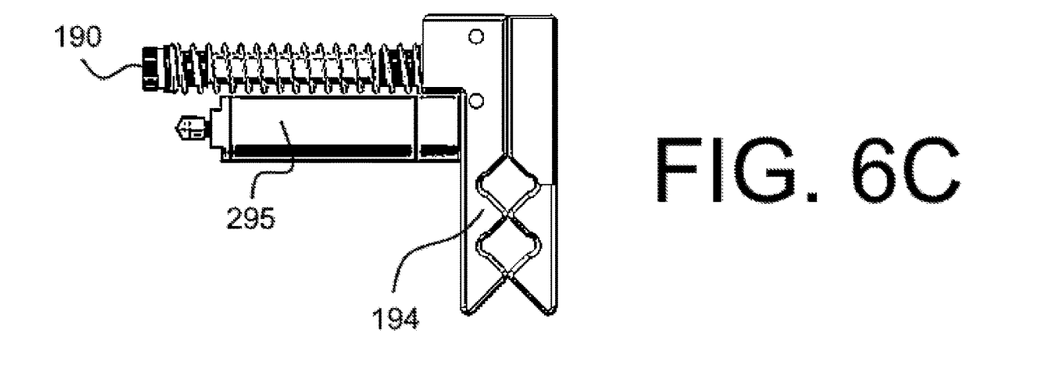
FIG. 6C is a detail illustration of an alternative utility end useable with example embodiment inspection assemblies.

FIGS. 6A, 6B, and 6C are illustrations of variations of utility end 191 shown in FIGS. 2 and 3 that are useable in example embodiment assemblies 100 or 200. For example, as shown in FIG. 6A, compressible clamp 192 may include two moveable jaws under constrictive force from cylinder 295 that may radially extend and or retract jaws of compressible clamp 192 to tighten and loosen the same. Or, for example, one jaw of clamp 192 may be stationary with cylinder 295 attached to a frame or base of assembly 100, such that extension or retraction of arm 190 loosens or tightens clamp 192. FIG. 6B illustrates a similar configuration, with an eyelet clamp 193 forming a quadrilateral opening with slightly rounded corners for gripping both round and angular-profiled tools under force from cylinder 295. FIG. 6C illustrates a multiple-eyelet clamp 194 that can hold multiple separate components in different eyelets when clamped.

FIG. 7 is an illustration of another variation of utility end 191 with a vertical maneuvering assembly 300 on or mounted to inspection arm 190. While assembly 300 may be vertically supported by inspection arm 191, such as by interfacing with utility end 191, assembly 300 may still be rotatable and moveable relative to arm 190. As seen in FIG. 7, assembly 300 may hold a vertical mast 301 connected to an inspection device such as inspection camera 400. Of course, an ultrasonic tester, welding tool, reactor component, etc. may similarly be joined to vertical maneuvering assembly 300. Mast 301 may be vertically moveable in direction 291, and potentially rotatable in direction 381, by maneuvering assembly 300. Or, as shown in FIG. 7, camera 400 may be further mounted on a pivoting hinge to mast 301 for rotation in direction 381 as well as pan and tilt control.

Figure 8:
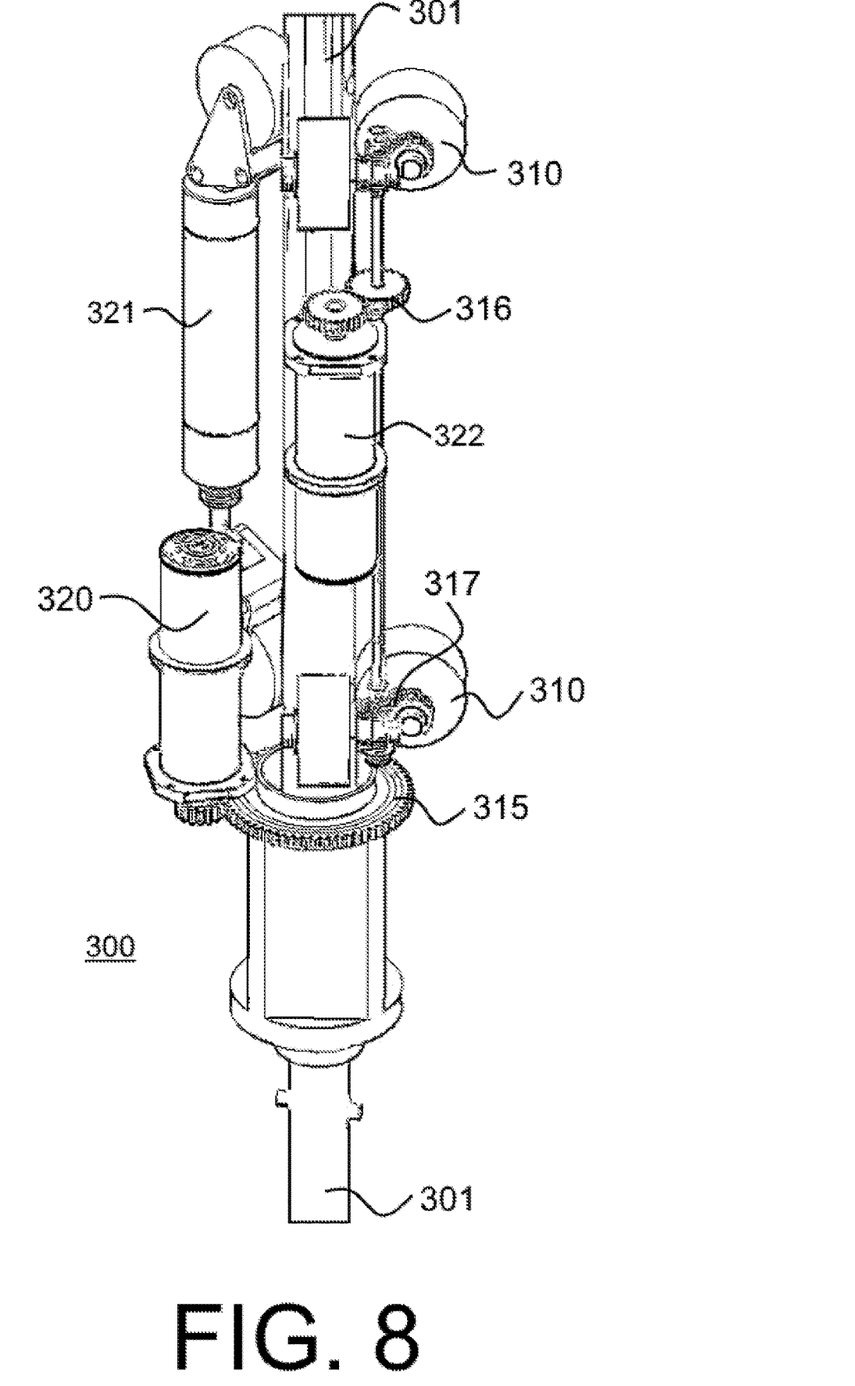
FIG. 8 is a selective interior illustration of the example embodiment vertical maneuvering assembly of FIG. 7.

FIG. 8 is a detail illustration of vertical maneuvering assembly 300 inside any surrounding housing or guard shown in FIG. 7. As seen in FIG. 8, vertical maneuvering assembly 300 includes several rollers 310 that grip and vertically maneuver mast 301. Rollers 310 may be resilient, compressible, and/or higher-friction to encourage force transfer to mast 301, such as an abrasion-resistant urethane. For example, rollers 310 may have roughened or adhesive surfaces to increase grip on mast 301, and rollers 310 may have other shapes, such as a scooped or shaped rolling surface that matches and partially surrounds mast 301, either under compression or as a natural static shape when uncompressed. Rollers 310 may be repeated at various vertical heights, such as two or more vertically-separated banks of three as shown in FIG. 8.

Figure 9:
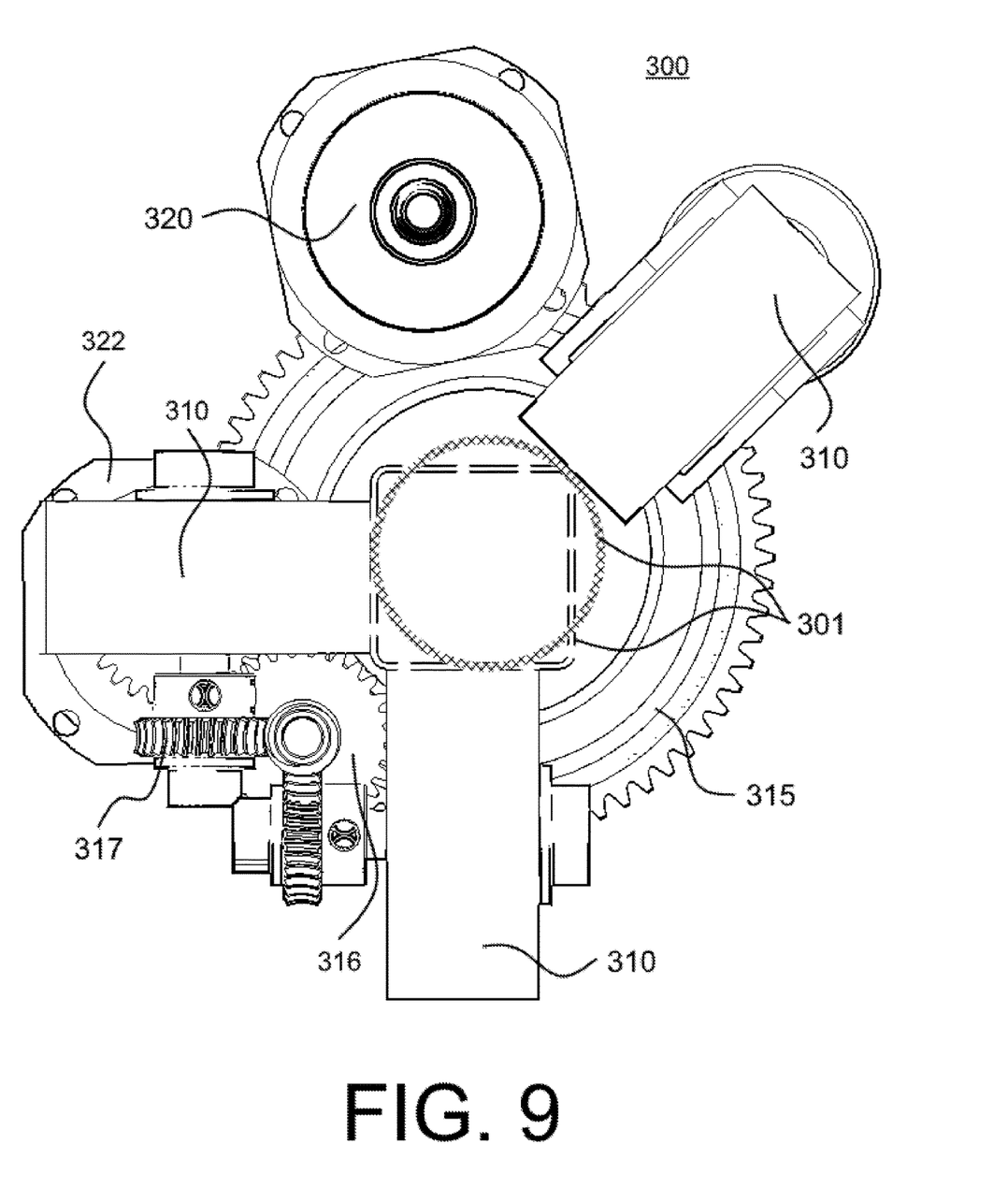
FIG. 9 is a cross-sectional axial illustration of the example embodiment vertical maneuvering assembly of FIG. 8.
Figure 10:
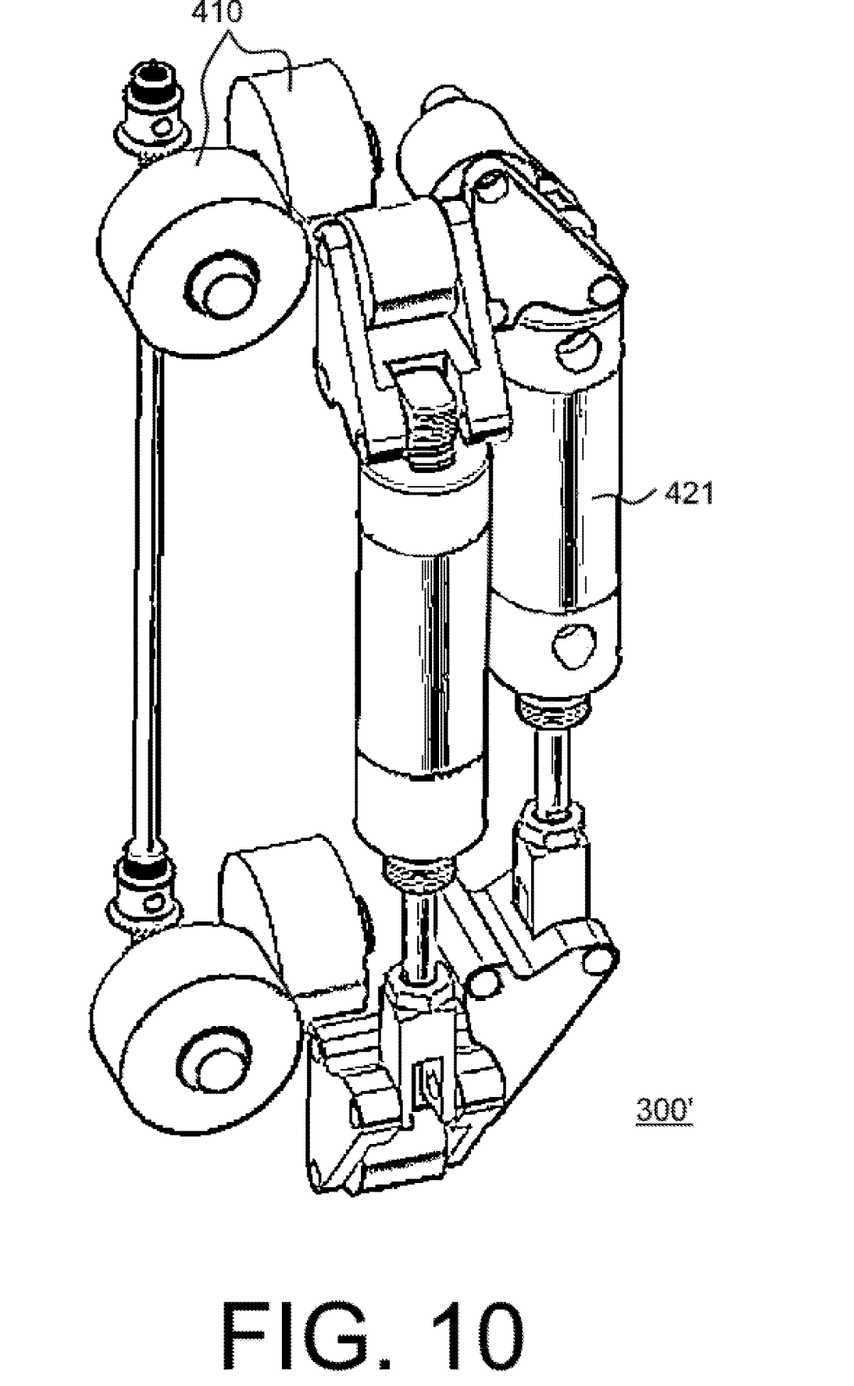
FIG. 10 is a selective interior illustration of another example embodiment vertical maneuvering assembly of FIG. 7.

Three rollers 310 are at different positions about a perimeter of mast 301, such as at even 120-degree intervals. As shown in FIG. 9, rollers 310 may also be spaced at other angular intervals, such as a 90-degree pair separated 135 degrees from the other roller 310, to better capture quadrilateral edges as well as round surfaces of mast 301. Or, similarly, as shown in FIG. 10, four rollers 410 in another example embodiment vertical maneuvering assembly 300' shown in relevant part may be positioned at even 90-degree intervals with engagement and release controlled by compression cylinders 421. As seen, any number and set of rollers in any angular configuration are useable in example embodiment assembly 300.

One or more compression cylinders 321 may bias rollers 310 inward to forcefully seat against mast 301. Compression cylinder 321 may connect to axles of vertically-adjacent rollers 310 or to other structures of assembly 300 at offset positions. Expansion of compression cylinder 312 will thus torque or rotate rollers 310 toward mast 301 for additional compression. Similarly, retraction of compression cylinder 312 may release rollers 310 from mast 301, allowing free movement and removal of mast 301 from assembly 300. Compression cylinder 321 may be a pneumatic telescoping cylinder that is remotely actuated or locally expanded and compressed by a motor or manually tensioned by manipulating a release or set latch. Of course, any other actuator or tensioner may be used for compression cylinder 321 to bias rollers 310 in desired directions, including turnbuckles, springs, and other expanders.

Vertical drive motor 322 may provide power or rotational force to one or more rollers 310 through a vertical drive transmission 316. For example, vertical drive motor 322 may include a gear that rotates when meshed with vertical drive transmission 316, which then rotates roller 310 through worm gear 317. Transmission 316 may connect to multiple rollers, such as upper and lower rollers 310 shown in FIG. 8 and move them in unison with proper gearing. For example, as shown in FIG. 9, transmission 316 may power multiple rollers 310 through plural worm gears 317. By rotating, rollers 310 may thus vertically move mast 301 up or down in direction 291 (FIG. 7) through assembly 300, achieving desired vertical displacement of a tool or device such as camera 400 with respect to a reactor component like a steam dam. Mast 301 may have any cross-sectional or perimeter shape, such as if mast 301 is a cable or rope with a round cross-section as shown in FIG. 9. Rotation of rollers 310 may act to vertically draw in or let out such rope or cable in direction 291 (FIG. 7) as mast 301. In the instance that mast 301 is stationary, assembly 300 may move itself vertically on mast 301 through rotation of rollers 310. Vertical drive motor 322 may be remotely actuated or locally controlled; of course, any other actuator or a connection from assembly 200 itself may be used to rotate rollers 310 and thus vertically position mast 301 in a desired direction.

As shown in FIG. 7, example embodiment vertical maneuvering assembly 300 may also be moveable angularly and selectively in direction 381. For example, a planetary motor 320 may be mounted on a stationary a sun gear 315 (FIG. 8) to rotate rollers 301, mast 301 secured therein, compression cylinder 321, vertical drive motor 322, transmission 316, and worm gear 317 independent of inspection arm 190, to which sun gear 315 may be secured. Sun gear 315 may be annular with an empty central portion through which mast 301 may pass. Planetary motor 320 may include a planetary gear, worm gear, or other structure that meshes with sun gear 315 to spin the selected elements of assembly 300 and mast 301 as the planetary gear rotates under force from motor 320. Planetary motor 320 may be remotely actuated or locally controlled, and other actuators or connections may be used to rotate on sun gear 315 and thus angularly position mast 301 in a desired position.

As shown in FIG. 7, example embodiment vertical maneuvering assembly 300 may be mounted on inspection arm 190 and supported by the same, but assembly 300 may vertically move and rotate mast 301 in directions 291 and 381 independent of inspection arm 190. For example, only a sun gear 315 may be rigidly secured to inspection arm 190, with the remainder of vertical movement assembly 300 being rotatable and mast 301 being further vertically movable relative to inspection arm 190. Motors 320 and 322 (FIG. 8) may move mast 301 and/or roller 310 independently of each other and inspection arm 190.

Figure 11:
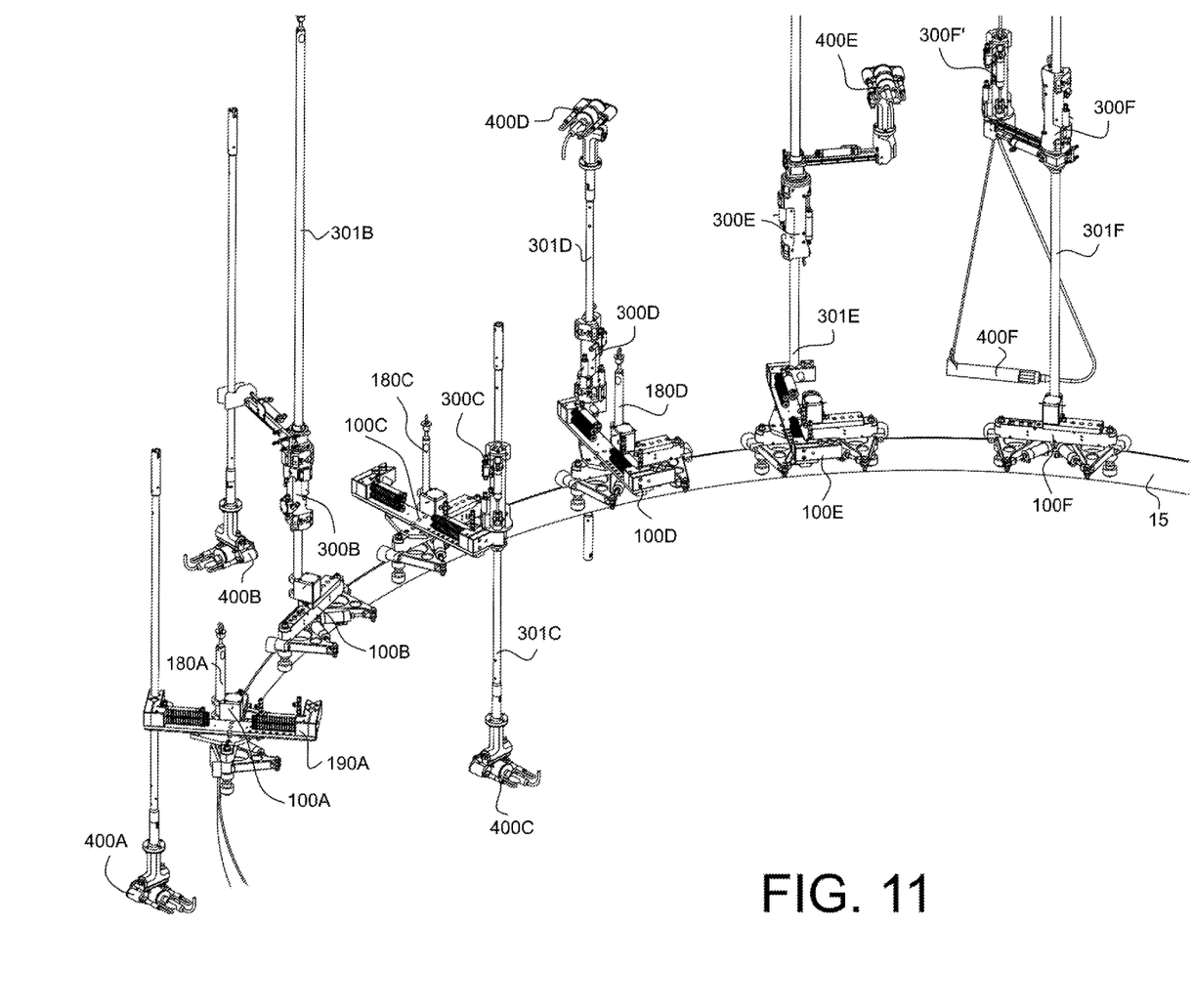
FIG. 11 is an illustration of several example embodiment maneuvering and inspection assemblies showing different configurations on a nuclear reactor steam dam.

FIG. 11 is an illustration of several different example embodiment inspection assemblies 100 on steam dam 15 in use with different configurations of vertical maneuvering assemblies 300. Example embodiment inspection assembly 100A may be similar to assembly 100 from FIGS. 2-4 selectively actuated with handling pole 180A, but with a double-ended inspection arm 190A having double eyelet clamp 194 from FIG. 6C. An instrument or tool 400A is clamped in one of the eyelets of the clamp that extends to an exterior of steam dam 15. Example embodiment inspection assembly 100B may be locally motorized, with no handling pole 180 for selective movement. A rigid vertical mast 301B extends directly from assembly 100B, on which example embodiment vertical maneuvering assembly 300B rides in a beanstalk fashion. By moving itself on mast 301B, assembly 300B also vertically moves a tool or instrument 400B extending therefrom in the vertical direction. Example embodiment inspection assembly 100C and vertical maneuvering assembly 300C may be similar to example embodiment vertical maneuvering assembly 300 from FIGS. 7-8, with assembly 100C driven by handling pole 180C. Mast 301B is suspended in example embodiment vertical maneuvering assembly 300C supported by an arm of assembly 100C. Example embodiment inspection assembly 100D has an opposite setup, with example embodiment vertical maneuvering assembly 300D extending outside of steam dam 15 and mast 301D extending upward to support tool 400D. Example embodiment inspection assembly 100E is motorized with no handling pole 180 and holds mast 103E in its arm. Example embodiment vertical maneuvering assembly 300E is mounted on mast 301E and traverses the same with an arm that supports instrument 400E. Example embodiment inspection assembly 100F is similarly motorized, with no handling pole or inspection arm but a central mast 301F extending directly from a frame or body of assembly 100F. Two example embodiment vertical maneuvering assemblies 300F and 300F' are used, with 300F on mast 301F and 300F' supported on an arm from 300F. Example embodiment vertical maneuvering assembly 300F' supports a camera 400F on a separate rope or cable mast secured to an end of camera 400F, and assembly 300D adjusts pitch of camera 400F by vertically driving the mast. Separate assembly 300F controls absolute vertical positioning of assembly 300F' and camera 400F as well as angular rotation of the same about mast 301F.

Example embodiment inspection assemblies 100 and 200 and vertical maneuvering assembly 300 are configured to operate in a nuclear reactor environment submerged in reactor coolant. As such, assemblies 100, 200, and 300 may be fabricated entirely of materials that maintain their physical characteristics in a reactor and radioactive environment. For example, glasses, hard plastics like HDPE, nickel alloys like Inconel, stainless steels, and/or zirconium alloys may all be used for various components of assemblies 100, 200, and 300 without risk of significant degradation or contamination. Similarly, although example embodiment assemblies 100, 200, and 300 are illustrated with mechanical and pneumatic features, any electrical sensors, controls, or motors may be waterproofed an outfitted with appropriate electrical wired or wireless connections to permit submerged operation and control.

Example embodiments and methods thus being described, it will be appreciated by one skilled in the art that example embodiments may be varied and substituted through routine experimentation while still falling within the scope of the following claims. For example, although the term "vertical" is used throughout this disclosure, it is understood that different orientations aside from strict up-and-down with respect to ground are useable for this dimension in example embodiments at different orientations. Or, for example, a variety of different structures aside from a steam dam atop a core shroud, as well as different sizes and configurations of steam dams, are compatible with and useable with example embodiments and methods simply through proper dimensioning of example embodiments—and fall within the scope of the claims. Such variations are not to be regarded as departure from the scope of these claims.

What is claimed is:

1. A positioning assembly for use in a nuclear reactor peripheral assembly, wherein the assembly comprises:
    a plurality of rollers configured to be supported by and moveable relative to the peripheral assembly;
    a mast extending between the plurality of rollers, wherein at least two of the rollers are each positioned on different sides of the mast from each other to secure the mast and create relative movement between the mast and the rollers when the rollers rotate; and
    a power transmission configured to provide power to the rollers.

2. The assembly of claim 1, wherein the plurality of rollers includes at least one of, three rollers evenly positioned about the mast, three rollers positioned at a 90-degree interval and two 135-degree intervals about the mast, and four rollers each positioned at 90-degree intervals about the mast.

3. The assembly of claim 2, wherein the plurality of rollers includes a first group of at least three rollers at a first position and a second group of at least three rollers at a second position separated from the first position along the mast.

4. The assembly of claim 3, further comprising:
    an expander joined between a roller of the first group and a roller of the second group, wherein the expander is configured to bias the roller of the first group and the roller of the second group against the mast by expanding.

5. The assembly of claim 1, further comprising:
    a motor connected to the power transmission configured to provide the power to the rollers.

6. The assembly of claim 5, wherein,
    the plurality of rollers includes a first group of rollers at a first position and a second group of rollers at a second position separated from the first position along the mast,
    the power transmission includes a shaft geared to the motor and extending to the first group of rollers and the second group of rollers, and
    the shaft connects to and powers at least two rollers of the first group and at least two rollers of the second group.

7. The assembly of claim 1, further comprising:
    a sun gear through which the mast passes, wherein the sun gear is configured to secure to the peripheral assembly, and wherein the rollers and the mast are connected to an exterior of the sun gear to revolve around the sun gear.

8. The assembly of claim 7, further comprising:
a motor connected to the exterior of the sun gear so as to power the revolving of the rollers and mast around the sun gear.

9. The assembly of claim 1, wherein the mast is at least one of, a rope or cable having a round perimeter, and a rigid pole having a quadrilateral perimeter, further comprising:
an instrument attached to the mast.

10. A peripheral assembly for use in a nuclear reactor, wherein the assembly comprises:
a clamp configured to clamp on opposite sides of a steam dam in the nuclear reactor, wherein the clamp allows circumferential movement of the assembly on the steam dam; and
a positioning assembly supported by the clamp, wherein the positioning assembly includes,
a plurality of rollers moveable relative to the clamp,
a mast extending between the plurality of rollers, wherein at least two of the rollers are each positioned on different sides of the mast from each other to secure the mast and create relative movement between the mast and the rollers when the rollers rotate, and
a power transmission configured to provide power to the rollers.

11. The assembly of claim 10, wherein the plurality of rollers includes at least one of, three rollers evenly positioned about the mast, three rollers positioned at a 90-degree interval and two 135-degree intervals about the mast, and four rollers each positioned at 90-degree intervals about the mast.

12. The assembly of claim 11, wherein the plurality of rollers includes a first group of at least three rollers at a first position and a second group of at least three rollers at a second position separated from the first position along the mast.

13. The assembly of claim 12, further comprising:
an expander joined between a roller of the first group and a roller of the second group, wherein the expander is configured to bias the roller of the first group and the roller of the second group against the mast by expanding.

14. The assembly of claim 10, further comprising:
a motor connected to the power transmission configured to provide the power to the rollers.

15. The assembly of claim 14, wherein,
the plurality of rollers includes a first group of rollers at a first position and a second group of rollers at a second position separated from the first position along the mast,
the power transmission includes a shaft geared to the motor and extending to the first group of rollers and the second group of rollers, and
the shaft connects to and powers at least two rollers of the first group and at least two rollers of the second group.

16. The assembly of claim 10, further comprising:
a sun gear through which the mast passes, wherein the sun gear is configured to secure to the peripheral assembly, and wherein the rollers and the mast are connected to an exterior of the sun gear to revolve around the sun gear.

17. The assembly of claim 16, further comprising:
a motor connected to the exterior of the sun gear so as to power the revolving of the rollers and mast around the sun gear.

18. The assembly of claim 10, wherein the mast is at least one of, a rope or cable having a round perimeter, and a rigid pole having a quadrilateral perimeter, further comprising:
an instrument supported by the mast and moveable relative to the clamp through movement of the positioning assembly.

19. The peripheral assembly of claim 10, further comprising:
an inspection arm radially extendable from at least one of the clamp and the positioning assembly; and
a utility end on the inspection arm configured to secure to an instrument.

20. The assembly of claim 19, further comprising:
a drive rod extending vertically upward from the clamp, wherein the drive rod connects to and moves one of, the clamp circumferentially on the steam dam, the clamp vertically relative to the steam dam, and the inspection arm radially, and wherein the drive rod is moveable vertically to connect to and move only one of the clamp and the inspection arm.

* * * * *